May 12, 1953
A. C. H. WEISS
2,637,915
APPARATUS FOR TREATING PULP AND RESIN MIXTURES
Filed May 6, 1948
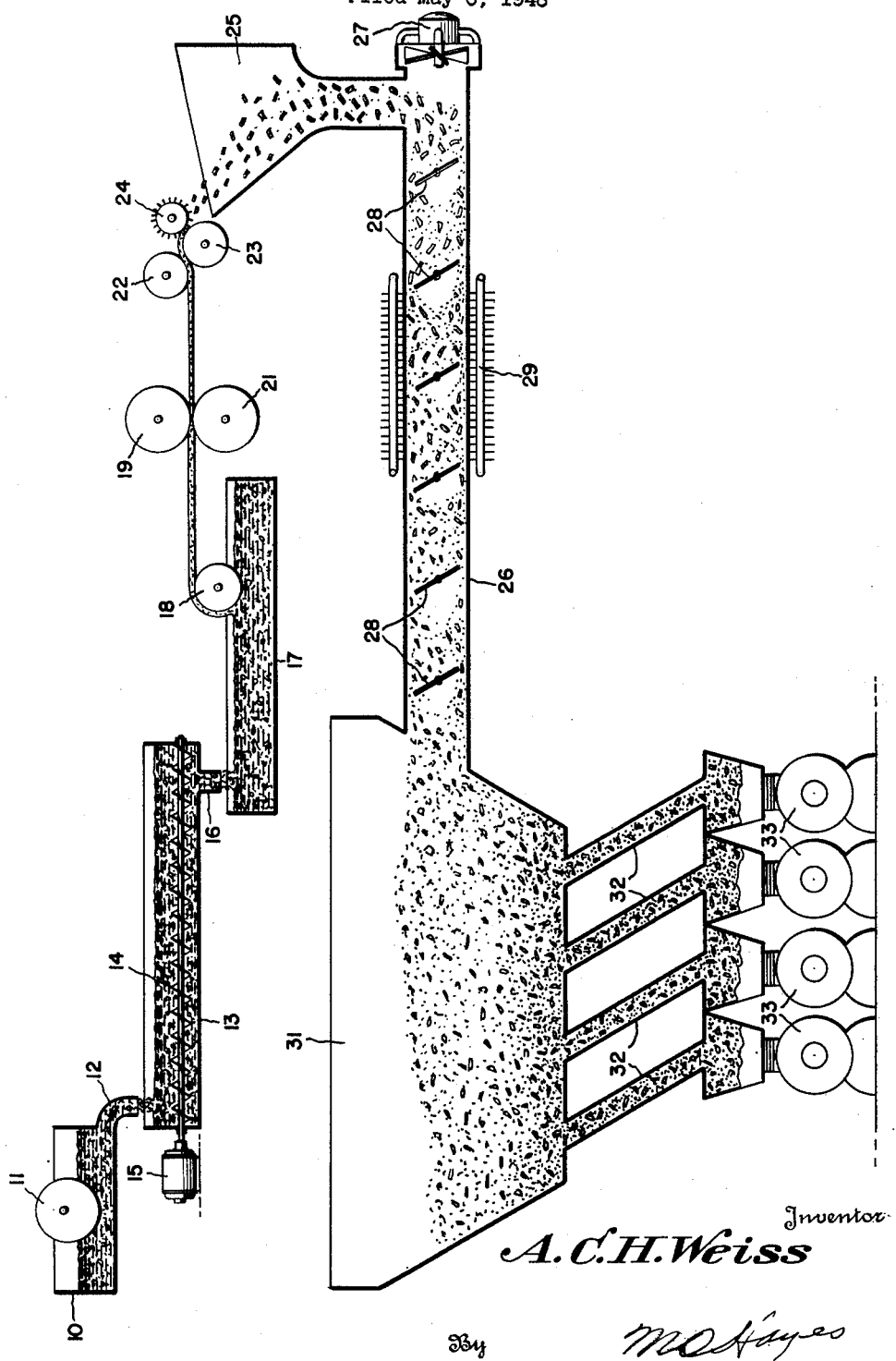
Inventor
*A.C.H.Weiss*
By *M. O. Hayes*
Attorney Patented May 12, 1953

2,637,915

UNITED STATES PATENT OFFICE 2,637,915

APPARATUS FOR TREATING PULP AND RESIN MIXTURES

Alexander C. H. Weiss, Silver Spring, Md.

Application May 6, 1948, Serial No. 25,445

2 Claims. (Cl. 34—57)

(Granted under Title 35, U. S. Code (1952), sec. 266)

The present invention relates to a continuous process for treating pulp and resin compounds in such a manner as to reduce the moisture content thereof sufficiently to render the compound particularly adapted for use in high pressure injection molds and without resorting to tedious and time consuming preforming operations.

In one of the arrangements of the prior art it has been the practice to preform the pulp and resin mixture by drawing the mixture by vacuum from a vat and into a screen having the approximate contour of the finished piece. The pulp thus formed is blown out of the screen and dried in a heated oven or if desired, at room temperature. The dried preformed pulp thereafter is inserted in a heated die and pressure molded to the finished form.

A disadvantage of the foregoing method is that the drying of the preformed pieces consumes an appreciable period of time, therefore there is a considerable delay between the preforming and heat molding operations.

Another arrangement of the prior art is that in which the pulp and resin mixture is drawn from the vat by the use of a rotating vacuum cylinder partially immersed in the mixture. As the cylinder rotates, the mixture forms thereon in a layer which may be drawn from the cylinder above the mixture. Flat shapes are cut from the sheet by dies and the material thereafter is placed in heated dies and molded under pressure. A disadvantage of the foregoing arrangement is that it can be used only for the molding of substantially flat objects, such, for example, as serving trays, plates, and the like.

In the method of the present invention the delays and limitations of the foregoing arrangements are obviated by the provision of a process which is continuous from the mixing of the basic ingredients to and including the molding of the finished piece. The preforming operation and the curing of the preformed material with attendant delay prior to heat molding have been eliminated. The present method is also adapted to produce a wider variety of shapes, in that, it is not limited to the production of substantially flat shapes.

The foregoing results are accomplished according to the present method by fluffing or breaking up a sheet of the mixture as obtained in the last named prior art arrangement and subjecting the resulting pieces of the mixture to a blast of turbulent air in a heated chamber containing adjustable baffles therein to impede the progress of the pieces as they are blown through the chamber. As a result of such treatment of the mixture, substantially all of the moisture is removed without resorting to a long curing process while also thus preparing the mixture in a manner particularly suitable for high pressure injection molding. It will readily be appreciated by those skilled in the art that many different shapes and forms of devices may be obtained in the use of injection molds, and the method of treatment of pulp and resin compound according to the present invention thus increases the range of usefulness of such compounds.

An object of the present invention is to provide a new and improved method and apparatus for preparing a pulp and resin mixture for injection molds in which the operation is progressive and continuous.

Another object is to provide a method of controlling the moisture content of the pulp and resin mixture.

Still another object is to provide apparatus for fluffing or breaking up the matted pulp and resin mixture to render it more adaptable to a dehumidifying process.

A further object is to provide a method of quickly removing a large percentage of the moisture content of the fluffed pulp and resin mixture to render it adaptable for use in injection molding machines.

A still further object is to provide apparatus for subjecting the fluffed pulp and resin mixture to heated turbulent air.

A still further object is to provide apparatus for adjusting the rate of flow of the fluffed pulp and resin mixture as it passes through the heating chamber.

Other objects and many of the attendant advantages of this invention will be readily appreciated as the same becomes better understood by reference to the following detailed description when considered in connection with the accompanying drawing wherein the single figure thereof is a diagrammatic representation of the method and apparatus of the present invention according to the preferred embodiment thereof.

Referring now to the drawing for a more complete understanding of the invention, there is indicated at 10 a tank having arranged therein and partially submerged in a mixture of kraft pulp and resin also contained therein a rotatable beater such, for example, as the eccentrically mounted drum 11 of any well known variety.

Positioned adjacent the bottom of tank 10 and at one end thereof is a spout 12, the purpose of which is to drain the tank of the mixture of kraft pulp and resin contained therein.

Subjacent the spout 12 a diluting and storage tank 13 is arranged, the tank 13 having a feed and agitator screw 14 running along the length thereof and submerged below the liquid level. The screw 14 is driven by any suitable source of power such as the electric motor 15 in a direction to move the mixture toward a spout 16 at the end of tank 13 opposite to that subjacent the spout 12.

A tank 17 has one end thereof positioned below spout 16. Tank 17 has arranged therein a perforated roll 18 partially submerged in the mixture contained therein, suction being applied to the interior of the roll to cause the mixture to adhere to the exterior thereof thereby to form a mat therefrom. The mat contains approximately 75% water at this point. The matted pulp and resin compound is scraped from the pick-up roll and passes along a conveyor (not shown) to heated squeeze rolls 19 and 21, the purpose of the rolls 19 and 21 being to compress the matted mixture and apply heat thereto, thereby to remove a certain proportion of the moisture therefrom. The foregoing steps are substantially those of the aforedescribed prior art method.

The matted pulp and resin sheet passes between a pair of compression rolls 22 and 23 and a staggered spike fluffing roll 24, the fluffing roll acting to cut or break the matted sheet into fragments of a convenient size for blowing through a heated chamber to be hereinafter more fully described. The moisture content of the mixture is approximately 50% water at this point.

As the cut fragments or fluffs of matted mixture or compound pass from the fluffing roll they drop into a hopper 25 which guides them into a heated blower chamber or duct 26. The chamber 26 has at one end thereof a blower 27 which forces air through the chamber. A plurality of adjustable baffles 28 are arranged in the chamber to retard the passage of the fragments through the chamber and to subject the fragments to turbulent agitation. It can be seen that when the baffles 28 are in a vertical position the duct 26 is substantially closed to the flow of fragments therethrough and when the baffles 28 are in a horizontal position the duct 26 provides a substantially unimpeded passage for the flow of particles. The chamber 26 has provided therefor a heater 29 supplied by a suitable source (not shown). The purpose of passing the fragments through the chamber is to remove a large percentage of the remaining moisture contained therein, the water content being maintained at approximately 5 to 7% after the foregoing operation by the adjustment of the baffles 28 to meet changing conditions such, for example, as changes in the moisture content of the fragments as they enter the hopper caused by variations of humidity in the atmosphere. Thus, the passage of the fragments through the chamber 26 may be accelerated by moving the baffles toward the open position when it is desired to remove a small amount of water, or the fragments may be retarded in their passage through the chamber and more thoroughly agitated by moving the baffles toward the closed position when it is desired to remove a larger amount of water.

The fragments after passing through the chamber 26 enter a reservoir 31. Attached to the bottom of reservoir 31 is a plurality of spouts 32 for the purpose of conveying the fragments to a plurality of injection molding machines 33, where the fragments are formed or molded to the required shape.

It will be understood that any suitable means, not shown, may be employed for driving the beater 11, rolls 19, 21, 22, and 23 and fluffing wheel 24.

As will be apparent from the foregoing description there has been provided a method and apparatus for preparing a mixture of kraft pulp and resin for injection molding in which the operation is continuous, there being no delays between the various operations for the purpose of curing or other processes which consume long periods of time.

It is to be noted that the mixture is prepared, by the use of the present method and apparatus, in such a manner that the moisture content is between 5 and 7 percent which is particularly well adapted for use in high pressure injection molds. Use of the foregoing method and apparatus thus makes possible high and economical production of a wide variety of plastic molded ordnance devices which require high resistance to impact such, for example, as plastic cartridge case plugs.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. Apparatus for extracting moisture from a mixture of kraft pulp and resin fragments having a high moisture content and comprising, in combination, a horizontally disposed duct having a blower mounted at one end thereof for blowing air forwardly therethrough, a hopper positioned above said duct forwardly of said blower, a plurality of pivoted butterfly baffles spaced longitudinally of said duct, each of said baffles extending across said duct in partially obstructing relation thereto, said baffles being adjustable from a horizontal position to a vertical position wherein said duct is substantially closed whereby the time required for passage of the air and fragments through said duct may be varied, and means for heating said duct to heat the air and fragments during the passage thereof through the duct whereby said fragments are partially dried by said heat.

2. Apparatus for extracting moisture from a mixture of kraft pulp and resin fragments having a high moisture content comprising, in combination, a horizontally disposed duct having a blower mounted at one end thereof for blowing air forwardly therethrough, a hopper positioned above said duct forwardly of said blower for feeding the fragments into the duct, a plurality of baffles spaced longitudinally within said duct, each of said baffles being pivoted for adjustment about a horizontal axis coincident with the middle of the baffle whereby said baffles extend across the duct in partially obstructing relation thereto to permit passage of the air and fragments above and below said baffles, said baffles being adjustable from a horizontal position to a vertical position wherein said duct is substantially closed, means for heating said duct to heat the air and fragments during the passage thereof through the duct whereby the fragments are partially dried by said heat, and hopper means for receiving the fragments at the other end of said duct.

ALEXANDER C. H. WEISS.

References Cited in the file of this patent

UNITED STATES PATENTS

| Number | Name | Date |
|---|---|---|
| 663,868 | Crean | Dec. 18, 1900 |
| 789,109 | Trump | May 2, 1905 |
| 1,401,795 | Kohler et al. | Dec. 27, 1921 |
| 1,907,046 | Darrah | May 2, 1933 |
| 2,017,586 | Cottee | Oct. 15, 1935 |
| 2,231,342 | Loyless | Feb. 11, 1941 |
| 2,266,640 | Joyce | Dec. 16, 1941 |
| 2,319,182 | Van Der Pyl | May 11, 1943 |
| 2,341,623 | Kern | Feb. 15, 1944 |
| 2,431,720 | Willey | Dec. 2, 1947 |
| 2,447,161 | Coghill | Aug. 17, 1948 |
| 2,480,851 | Goss | Sept. 6, 1949 |
| 2,497,501 | Himmel et al. | Feb. 14, 1950 |
| 2,513,370 | Shaw | July 4, 1950 |

FOREIGN PATENTS

| Number | Country | Date |
|---|---|---|
| 881,517 | France | Jan. 28, 1943 |